Oct. 3, 1961 R. A. SHAW 3,002,716
AIRCRAFT
Filed Feb. 27, 1957 2 Sheets-Sheet 1
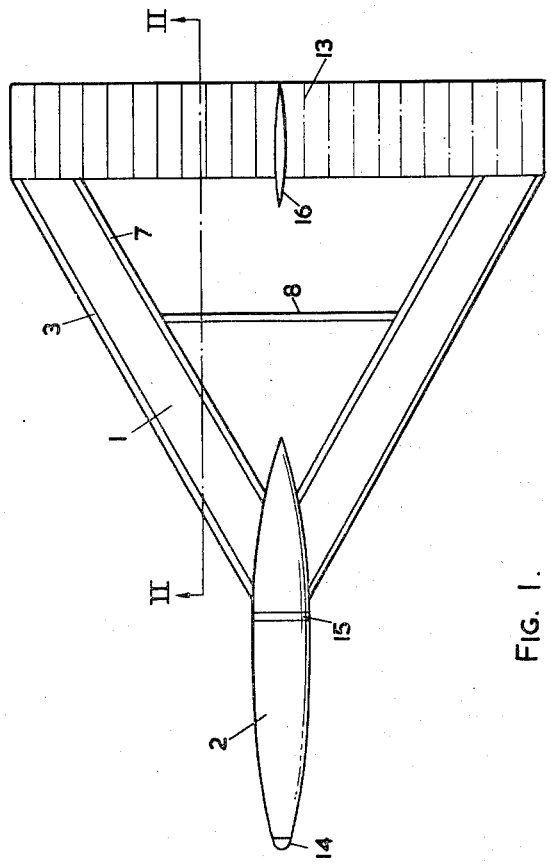
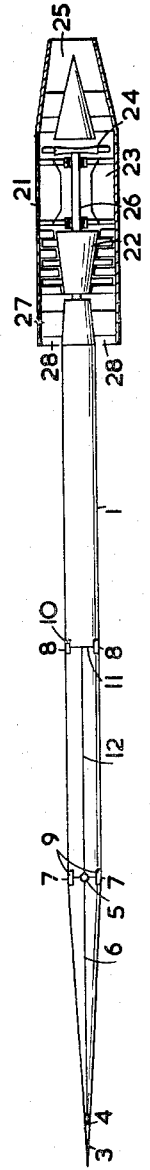
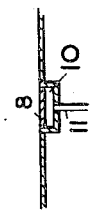
Inventor
Ronald Andrew Shaw
By
Stevens, Davis, Miller & Mosher
his Attorneys Oct. 3, 1961  R. A. SHAW  3,002,716
AIRCRAFT
Filed Feb. 27, 1957  2 Sheets-Sheet 2

Inventor
Ronald Andrew Shaw
By
Stevens, Davis, Miller & Mosher
his Attorneys

3,002,716
AIRCRAFT
Ronald Andrew Shaw, Hemel Hempstead, England, assignor to Power Jets (Research and Development) Limited, London, England, a British company
Filed Feb. 27, 1957, Ser. No. 642,909
Claims priority, application Great Britain Mar. 1, 1956
15 Claims. (Cl. 244—117)

This invention relates to aircraft intended for flight at very high supersonic speeds. In such aircraft the problem of overheating of the aircraft surface is very serious; for example, the temperature on the surface of an aircraft flying at Mach 5 may be as high as 1100° C. and unless materials capable of withstanding such high temperatures can be used, it is necessary to make provision for cooling the aircraft surface.

In one known arrangement for cooling a surface exposed to a hot gas stream, a fluid, which may be a liquid or a gas, is emitted through one or more apertures in the surface to be cooled so that it forms a layer over the surface, protecting it from the hot gas stream. If a liquid is used, then as long as the layer is maintained in liquid form, the temperature of the surface cannot exceed the boiling point of the liquid. The cooling is effected by the evaporation of the liquid, the liquid layer consequently tending to become progressively thinner downstream of the point of emission. One of the most effective techniques involving the use of fluid for cooling in this manner is sweat or effusion cooling in which the apertures are distributed uniformly over the surface so that the fluid issues into the hot gas stream all over the surface to be cooled.

In an aircraft, however, it would in general be impracticable to carry a supply of a special cooling fluid for the sole purpose of cooling the aircraft surface. According to the present invention, therefore, it is proposed to use a liquid for cooling the surface of the aircraft, this liquid subsequently being utilized in the aircraft engine or engines.

More particularly the invention provides an aircraft in which provision is made for cooling at least part of the outer surface thereof by emitting a liquid to form a protective cooling layer which flows rearwardly over the surface, the aircraft having at least one engine with an intake arranged to receive this layer.

The liquid may be fuel which is burnt in the engine or engines but any other liquid which can be usefully employed e.g. to produce power in the engine or engines might be used.

The invention will now be more fully described by way of example with reference to the accompanying diagrammatic drawings of which:

FIGURE 1 is a plan view of an aircraft intended for flight at very high supersonic speeds, e.g. of the order of Mach 5.

FIG. 2 is a sectional view of one wing of the aircraft taken on the line II—II in FIGURE 1.

FIGURES 3 and 4 are details of the aircraft wing shown in FIGURE 2 drawn to a larger scale.

Figure 5:
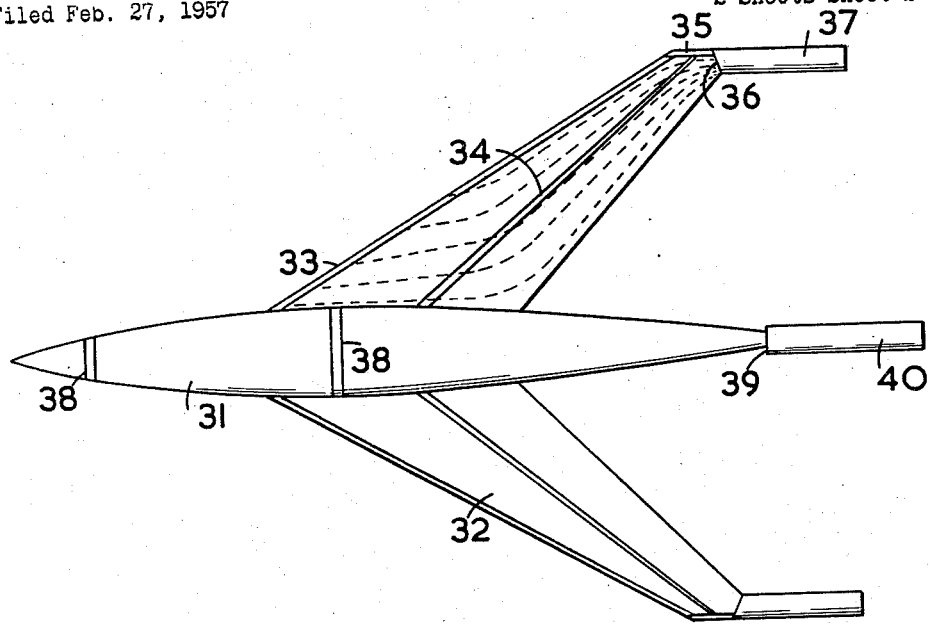
FIGURES 5 and 6 are plan views of two further aircraft embodying the invention.

The aircraft shown in FIGURES 1 and 2 comprises thin wings 1 of delta plan form with very sharp leading edges, and a fuselage in the form of a nacelle or forebody 2 extending forwardly from the apex of the delta and merging smoothely into the upper and lower surfaces of the wings at its rearward extremity.

The leading edge of each wing is constituted by a strip 3 of liquid pervious material (see FIGURE 3), e.g. perforated or slotted sheet or sintered metal sheet, extending along the full wing span. The strip is shaped to the appropriate leading edge profile and constitutes part of the wall of a duct 4 extending along the wing leading edge immediately within the wing surface. Liquid fuel is supplied from a manifold 5 connected to the aircraft fuel tanks to this duct through a pipe 6, and the fuel percolates through the strip of liquid-pervious material 3 on to the outer surface of the wing, thus serving to cool the wing leading edge by sweat or effusion cooling. The fuel is then carried rearwardly over the upper and lower surface of the wing in the wing boundary layer and accordingly forms a protective cooling layer for the wing.

As the fuel layer is carried rearwardly over the wing surface, it will be evaporated in the wing boundary layer, and when it is all evaporated the temperature of the wing surface will rise. Accordingly provision is made for introducing further fuel to renew the protective cooling layer at positions on the wing surface where the temperature approaches the maximum permissible value. Further strips 7, 8 of liquid-pervious material are therefore let into the upper and lower surfaces of the wing at positions spaced at intervals rearwardly from the wing leading edge. The wing is formed with further ducts 9, 10 connected to the manifold 5 by pipes 11, 12 (see for example, FIGURE 4) whereby fuel is supplied to percolate through the strips 7, 8 on to the wing surface in the same manner as at the wing leading edge. Thus a protective layer covers substantially the whole of the upper and lower surfaces of the wings.

It will of course be understood that the number and arrangement of the further strips for emitting fuel may be varied according to the particular design of the aircraft wing. In some cases the fuel layer emitted at the wing leading edge may persist over the whole of the wing surface and in this case provision for emitting further fuel may be unnecessary.

It may be that the fuel layer from the leading edge will persist over the whole wing surface in some flight conditions but not in others, and accordingly provision may be made for emitting fuel through the further strips 7, 8 only when required. Thus the fuel supply to each strip may be separately controlled by valves in the pipes 6, 11, 12. A number of temperature sensitive elements such as thermocouples are installed in the surface of the aircraft wing, and these elements are connected to operate relays or the like whereby the appropriate valves are opened to permit further fuel to be emitted when a predetermined temperature rise on the aircraft surface takes place. Thus there may be one such element adjacent the strip 7, and if the temperature in this region becomes excessive due to the fuel layer from the leading edge being completely evaporated, it operates a valve to allow further fuel to be emitted through strip 7 to renew the layer. The emission of fuel through strips 8 may be similarly controlled.

Alternatively or in addition the temperature sensitive elements may serve to vary the emission of fuel from any or all the strips in dependence on the surface temperature, for example, to increase the amount of fuel emitted at the wing leading edge as the temperature increases. Since the temperature is dependent in part on the forward speed of the aircraft, the fuel supply may be controlled by a device responsive to aircraft Mach number.

The aircraft is powered by a number of gas turbine jet propulsion engines 13 disposed along the wing trailing edge. Each engine is of conventional type with an outer casing 21 enclosing a compressor 22 a combustion system 23 and a turbine 24 discharging through a jet pipe 25 and driving the compressor through a shaft 26. Each engine is supported from the rear of the wing by struts 27 extending across its air intake which is bifurcated so that there are forwardly facing intake openings 28 receiving air from both above and below the aircraft wing. The intake openings 28 of the engines may be elongated in a spanwise sense and adjacent intakes are contiguous at their ends so that on both the upper and lower surfaces of the wing there is in effect a single intake opening extending along substantially the whole of the wing trailing edge. These openings necessarily have a depth which is somewhat greater than the thickness of the wing boundary layer and so substantially all the fuel which has been emitted through the aircraft surface to cool the wing is received by the engines together with the intake air. The fuel is carried with the air through the compressor into the engine combustion system 23 where it is ignited and burnt.

Fuel may also be emitted through liquid-pervious sections 14, 15 of the surface of the fuselage to cool the fuselage in a like manner, this fuel also being carried into the engine intakes. Fuel may also be emitted to cool the surface of the aircraft fin 16 in the same way. It may be possible to allow the comparatively small amount of fuel used to cool the fin to go to waste, but otherwise there may be a further engine mounted on the fin with its intake arranged to receive the fuel in the boundary layer thereof.

If the fuselage 2 is such that it extends rearwardly of the wing trailing edge, there may be a further jet propulsion engine mounted on its rearward extremity with an annular air intake extending around the periphery of the fuselage and receiving the fuel emitted on to the surface thereof as described below with reference to FIGURES 5 and 6.

In the embodiment herein described the engines 13 are shown with their outer casings touching, but they might be spaced apart. Alternatively the engines may be of a ram jet type. Since this type of engine need not necessarily have a gas flow passage therethrough which is of circular cross-section, there may be a single ram jet engine of elongated cross-section extending along the whole of the wing trailing edge.

Since in the aircraft described herein the engines occupy the whole of the trailing edge it may not be possible to provide aircraft flying controls of the conventional type, and so control of the aircraft may be in part effected by differential control of the engines, and/or by deflecting the jet streams discharged therefrom. Accordingly some or all of the engines may be provided with swivelling jet nozzles or the like in known manner.

Figure 6:
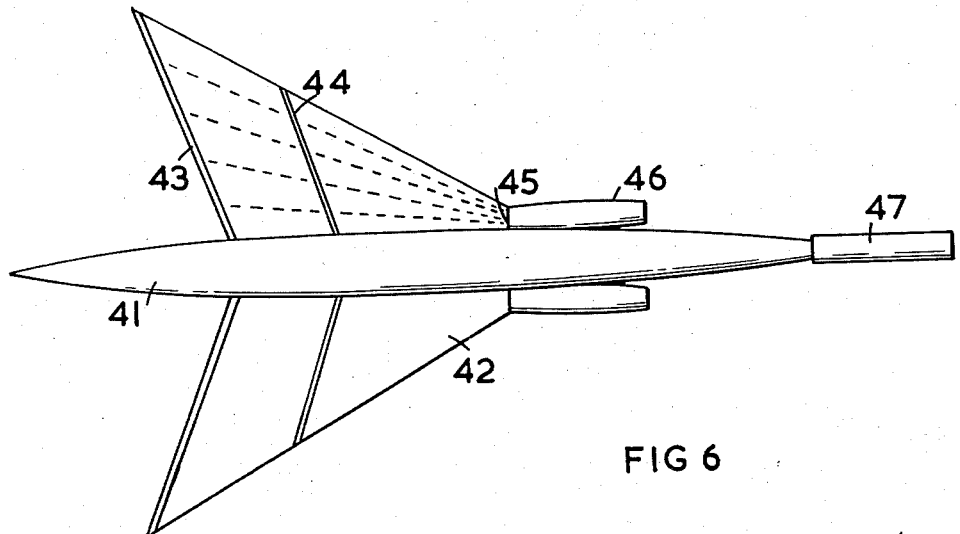

In the embodiment of FIGURES 5 and 6 the aircraft have wings which are so shaped in plan and section that the boundary layer tends to converge towards a relatively narrow part of the wing span, especially at supersonic speeds, so that the engine intakes need only be at those parts of the trailing edge where the boundary layer collects and it is unnecessary for them to extend along the full span. Thus in FIGURE 5, the aircraft has a fuselage 31 and a pair of highly swept back wings 32. In such a configuration the boundary layer tends to converge towards the wing tips. Fuel is emitted through liquid-pervious strips 33, 34 extending along the wing as in the previously described embodiment, and is carried by the boundary layer towards the wing tips as indicated by the broken lines, being finally guided by wing tip fairings 35 into the intake 36 of jet engines 37 mounted cantilever fashion aft of the wing trailing edges at the wing tips. As shown in the drawing, the engine intakes 36 are slightly skewed relative to the engine axis so as to receive the boundary layer.

Fuel is also emitted to cool the surface of the fuselage 31 through liquid-pervious strips such as 38. This fuel is carried rearwardly over the surface of the fuselage into the annular intake 39 of a further jet engine 40 mounted at the rearward extremity of the fuselage.

FIGURE 6 shows an aircraft having a fuselage 41 and a pair of swept forward wings 42 on which the boundary layer tends to converge towards the wing roots. Fuel emitted on to the surface of the wing through liquid-pervious strips 43, 44 in the manner already described is carried by the boundary layer as indicated by the broken lines into the intakes 45 of jet engines 46 mounted aft of the wing trailing edge close to or within the fuselage. There is a further jet engine 47 mounted at the rearward extremity of the fuselage with its intake arranged to receive fuel emitted on to the surface of the fuselage as in the embodiment of FIGURE 5.

In an aircraft of delta configuration as in the embodiment of FIGURES 1–4 there may also be a tendency for the boundary layer to converge towards certain regions of the wing trailing edge, in particular towards the wing tips, and so it may not be necessary to have engines along the whole of the wing trailing edge. In any case the tendency to convergence of the boundary layer can be promoted or assisted by the provision of suitably arranged strakes, fences or vortex generators set in the wing surface ahead of the engine intakes.

It will be appreciated that in all the embodiments described herein it may not be possible to cool certain parts of the aircraft surface by the use of fuel in the manner described above unless the fuel so used is allowed to go to waste. If this is not permissible, such parts, e.g. the surfaces of the engine casings 21, must be made of a material capable of withstanding the high temperature involved.

Aircraft of the type with which this invention is concerned will normally fly at very high altitudes, and for this reason, and also to prevent the fuel used for cooling the outer surface leaking into the aircraft, pressurisation of the interior thereof is normally necessary. The pressurising air is received through a forwardly facing inlet which may be in, for example, the nose of the fuselage or the wing leading edge. It may not be possible to cool the region of this inlet by the use of fuel, and so this part of the aircraft surface may be made of a material capable of withstanding high temperatures. Further, provision may be made for refrigerating the pressurising air.

The fuel is not necessarily emitted through apertures in the form of liquid-pervious sections of the aircraft surface as described above. In some cases it may be emitted through rearwardly facing slots which are arranged so as to direct the fuel rearwardly over the aircraft surface.

It is believed that the fuel evaporating in the aircraft boundary layer will, by its cooling effect, have an additional effect of promoting laminar flow, and the fuel flowing over the surface can be expected to maintain it free of any deposits.

A separate fuel supply direct to the engines may be provided for use in low speed flight and to supplement the fuel entering the engines with the boundary layer when necessary.

Liquids other than fuel may be used for cooling the aircraft surface. Thus a water-methanol mixture may be used in an aircraft powered by gas-turbines, this mixture serving for thrust boosting in known manner.

I claim:

1. An aircraft for flight at high supersonic speeds having an outer surface over which, when the aircraft is in flight at said speeds, there is a relative airflow at a velocity such as to cause aerodynamic heating of said surface, the surface being formed with at least one aperture, the aircraft comprising at least one jet engine arranged to produce forward thrust on the aircraft, a source of supply of a liquid capable of being used in said engine to produce power, and a liquid supply connection between said source and said aperture, said aperture being arranged to emit said liquid onto said surface in such a direction and at such a velocity as to form a protective cooling layer which will flow rearwardly from said aperture over at least part of said surface, and said engine having a generally forwardly facing air intake spaced rearwardly from said aperture to which intake said surface extends and arranged to receive at least part of said layer.

2. An aircraft according to claim 1 wherein said aperture is located at the forward edge of said surface in relation to the direction of flight and said intake is located at the rearward edge thereof.

3. An aircraft according to claim 1 wherein said aperture is constituted by a liquid-pervious section of said surface.

4. An aircraft according to claim 1 wherein said aperture is constituted by a slot in said surface.

5. An aircraft according to claim 1 wherein the liquid is fuel.

6. An aircraft for flight at high supersonic speeds comprising a wing having an outer surface over which when the aircraft is in flight at said speeds, there is a relative airflow at a velocity such as to cause aerodynamic heating of the surface, the surface being formed with at least one aperture, at least one jet engine mounted at the rear of the wing and arranged to produce forward thrust on the aircraft, a source of supply of a liquid capable of being used in said engine to produce power, and a liquid supply connection between said source and said aperture, said aperture being arranged to emit said liquid onto said wing surface in such a direction and at such a velocity as to form a protective cooling layer which will flow rearwardly from said aperture over at least part of said surface, and said engine having a generally forwardly facing air intake spaced rearwardly from said aperture and arranged to receive at least part of said layer.

7. An aircraft according to claim 6 comprising a plurality of jet engines mounted at the rear of the wing, said engines having generally forwardly facing air intakes together extending along the whole of the wing trailing edge.

8. An aircraft according to claim 6 wherein the wing is of such a configuration that the boundary layer thereon tends to converge towards one region of the wing trailing edge, said jet engine being mounted with its air intake in said region.

9. An aircraft according to claim 6 wherein said aperture extends along the leading edge of the wing.

10. An aircraft according to claim 9 wherein said wing surface is formed with further apertures spaced rearwardly from the wing leading edge, and the aircraft comprises liquid supply connections between said source and said further apertures, each said further aperture being arranged to emit said liquid onto said wing surface at a position spaced rearwardly from the wing leading edge in such a direction and at such a velocity as to form a protective cooling layer which will flow rearwardly from that aperture over at least part of said wing surface.

11. An aircraft according to claim 10 wherein the apertures are arranged so that the liquid layer covers substantially the whole of the wing surface.

12. An aircraft for flight at high supersonic speed comprising a wing having upper and lower outer surfaces over which, when the aircraft is in flight at said speeds, there is a relative airflow at a velocity such as to cause aerodynamic heating of the surface, each said surface being formed with at least one aperture, at least one jet engine mounted at the rear of the wing and arranged to produce forward thrust on the aircraft, a source of supply of a liquid capable of being used in said engine to produce power, and liquid supply connections between said source and each said apertures, each said aperture being arranged to emit said liquid onto the surface in which that aperture is formed in such a direction and at such a velocity as to form a protective cooling layer which will flow rearwardly from said aperture over at least part of said surface, and said engine having a bifurcated generally forwardly facing air intake, one part being above and one part below the wing, said parts being spaced rearwardly from the apertures and arranged to receive at least part of said layers on said upper and lower wing surfaces respectively.

13. An aircraft for flight at high supersonic speeds comprising a swept-back wing having an outer surface over which, when the aircraft is in flight at said speeds, there is a relative airflow at a velocity such as to cause aerodynamic heating of the surface, the surface being formed with at least one aperture, at least one jet engine mounted at the rear of the wing at the wing tip and arranged to produce forward thrust on the aircraft, a source of supply of a liquid capable of being used in said engine to produce power, and a liquid supply connection between said source and said aperture, said aperture being arranged to emit said liquid onto said wing surface in such a direction and at such a velocity as to form a protective cooling layer which will flow rearwardly from said aperture over at least part of said surface, and said engine having a generally forwardly facing air intake spaced rearwardly from said aperture and arranged to receive at least part of said layer.

14. An aircraft for flight at high supersonic speeds comprising a swept-forward wing having an outer surface over which, when the aircraft is in flight at said speeds, there is a relative airflow at a velocity such as to cause aerodynamic heating of the surface, the surface being formed with at least one aperture, at least one jet engine mounted at the rear of the wing at the wing root and arranged to produce forward thrust on the aircraft, a source of supply of a liquid capable of being used in said engine to produce power, and a liquid supply connection between said source and said aperture, said aperture being arranged to emit said liquid onto said wing surface in such a direction and at such a velocity as to form a protective cooling layer which will flow rearwardly from said aperture over at least part of said surface, and said engine having a generally forwardly facing air intake spaced rearwardly from said aperture and arranged to receive at least part of said layer.

15. An aircraft for flight at high supersonic speeds comprising a fuselage having an outer surface over which, when the aircraft is in flight at said speeds, there is a relative airflow at a velocity such as to cause aerodynamic heating of the surface, the surface being formed with at least one aperture, at least one jet engine mounted at the rear of said fuselage and arranged to produce forward thrust on the aircraft, a source of supply of a liquid capable of being used in said engine to produce power, and a liquid supply connection between said source and said aperture, said aperture being arranged to emit said liquid onto said wing surface in such a direction and at such a velocity as to form a protective cooling layer which will flow rearwardly from said aperture over at least part of said surface, and said engine having a generally forwardly facing air intake spaced rearwardly from said aperture and arranged to receive at least part of said layer.

References Cited in the file of this patent

UNITED STATES PATENTS

| | | |
|---|---|---|
| 1,426,907 | Ramsey | Aug. 22, 1922 |
| 2,457,031 | Campbell et al. | Dec. 21, 1948 |
| 2,522,114 | Goddard | Sept. 12, 1950 |
| 2,622,688 | Lee | Dec. 23, 1952 |
| 2,624,281 | McNally | Jan. 6, 1953 |
| 2,751,168 | Stalker | June 19, 1956 |
| 2,832,528 | Spears | Apr. 29, 1958 |

FOREIGN PATENTS

| | | |
|---|---|---|
| 857,780 | France | Apr. 26, 1940 |